Figure 1:
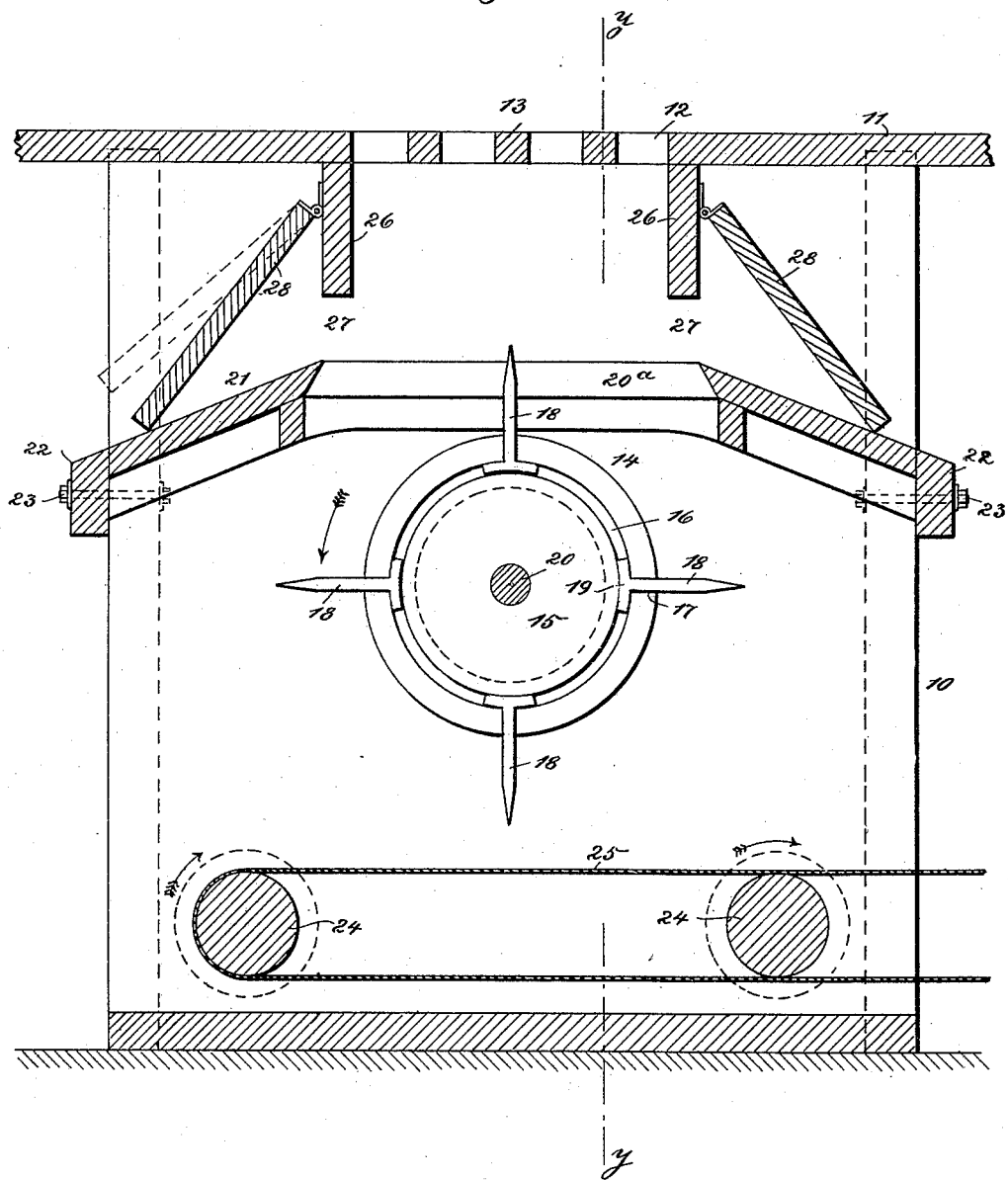

(No Model.) 2 Sheets—Sheet 1.

J. W. SHAFFER.
MACHINE FOR PULVERIZING CLAY AND EXTRACTING STONES.

No. 401,862. Patented Apr. 23, 1889.

WITNESSES:
D. C. Reusch.
C. Sedgwick

INVENTOR:
J. W. Shaffer
BY Munn & Co.
ATTORNEYS.

(No Model.) 2 Sheets—Sheet 2.
J. W. SHAFFER.
MACHINE FOR PULVERIZING CLAY AND EXTRACTING STONES.
No. 401,862. Patented Apr. 23, 1889.
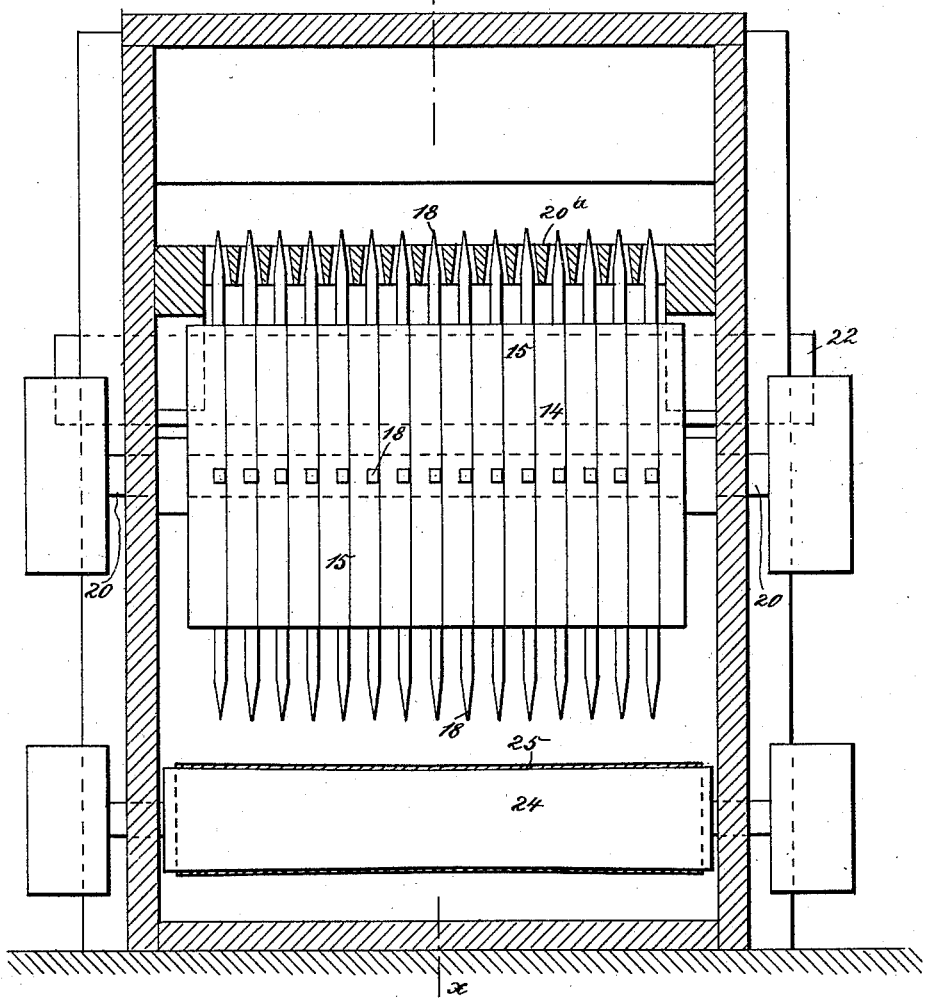
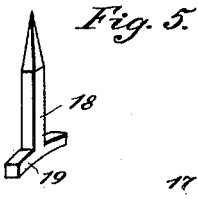
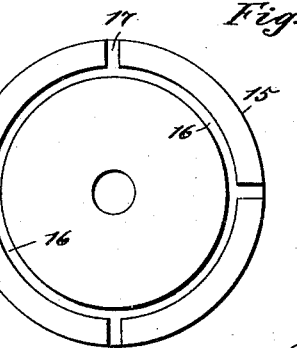
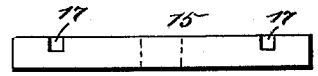
WITNESSES:
D. C. Reusch
C. Sedgwick
INVENTOR:
J. W. Shaffer
BY Munn & Co.
ATTORNEYS.

UNITED STATES PATENT OFFICE.

JOHN W. SHAFFER, OF PHILADELPHIA, PENNSYLVANIA.

MACHINE FOR PULVERIZING CLAY AND EXTRACTING STONE.

SPECIFICATION forming part of Letters Patent No. 401,862, dated April 23, 1889.

Application filed September 25, 1888. Serial No. 286,324. (No model.)

*To all whom it may concern:*

Be it known that I, JOHN W. SHAFFER, of Philadelphia, in the county of Philadelphia and State of Pennsylvania, have invented a new and Improved Machine for Disintegrating Clay and Extracting Stones, of which the following is a full, clear, and exact description.

My invention relates to an improvement in machines for disintegrating clay and extracting stones, and has for its object to provide a means whereby the clay will be separated into minute particles in an expeditious manner, and wherein the stones will be extracted from the clay while being manipulated without becoming crushed; and a further object of the invention is to provide a machine of simple and durable construction, and which may be conveniently operated.

The invention consists in the construction and combination of the several parts, as will be fully described hereinafter, and then pointed out in the claims.

Reference is to be had to the accompanying drawings, forming a part of this specification, in which similar figures of reference indicate corresponding parts in all the views.

Figure 1 is a longitudinal vertical section on line $x\ x$ of Fig. 2. Fig. 2 is a transverse vertical section taken on line $y\ y$ of Fig. 1. Fig. 3 is a side elevation of one of a series of disks constituting a drum or cylinder. Fig. 4 is a plan view of the same, and Fig. 5 is a perspective view of one of the teeth detached.

In carrying out the invention a box or casing, 10, having open ends, is built beneath the floor 11 of a store-house or apartment in which the clay is usually kept. The said floor 11 is provided with an opening, 12, leading into the center of the box 10. The opening 12 is preferably provided with a grating, 13, the purpose of the grating being to prevent large clogs of clay or large stones from passing downward into the box.

Transversely of the box 10, and beneath the opening 12 in the floor, a cylinder, 14, is journaled, consisting of a series of disks, 15, one of which is illustrated detached in Fig. 3. Each disk 15 is provided upon one face, near the periphery, with an annular groove, 16, and diametrical grooves 17, extending inward from the periphery to an intersection with the said annular groove. The grooves 16 and 17 are adapted for the reception of a tooth, 18, illustrated in Fig. 5, which tooth is provided with a T-head, 19. The straight shank of the tooth is made to enter the diametrical groove 17, and the head 19 that portion of the annular groove 16 contiguous to the diametrical groove.

In building up the cylinder the several disks having teeth attached are passed one after the other upon a spindle, 20, whereby the cylinder is journaled, and the disks 15 are so located upon the cylinder that the smooth side of the disk will be in contact with the grooved face of the next disk. In the construction of the cylinder 14 four rows of spaced teeth are usually employed; but the number of rows may be increased or decreased, as desired, and the distance the teeth project from the cylinder may be regulated as in practice will be found most advantageous.

Immediately above the cylinder 14 a grating, $20^a$, is stationed, the bars of which grating extend longitudinally of the box or at a right angle with the longitudinal axis of the cylinder, as best illustrated in Fig. 1. The teeth 18 of the cylinder are adapted to pass up between the several bars constituting the grating $20^a$ and project a distance above the upper face of the same.

The grating $20^a$ constitutes an integral portion of a plate, 21, the ends of which at the termination of the grating are made to incline or slant downward, as best shown in Fig. 2. The outer ends of the plate 21 are provided with an attached strip, 22, of greater length than the width of the said plate, and the projecting ends of the said strip 22 are secured to the ends of the box 10 by a bolt, 23, a set-screw, or other equivalent and readily-detached fastening device. It will be observed by reason of this construction that the plate 21, carrying the grate $20^a$, may be adjusted vertically to maintain at all times the same position with relation to the teeth 18.

At or near the bottom of the box 10 two or more transverse drums, 24, are pivoted, adapted to carry an endless apron, 25. The apron 25 is purposed to carry away the disintegrated clay, and the drums carrying the said apron revolve in a direction opposite to the direction of the toothed cylinder.

Vertical partitions 26 are provided at each end of the floor-opening 12, projecting downward in direction of the plate 21, a space, 27, being made to intervene the grating of the plate and the under edge of the said partitions. To the outer face of each of the partitions 26 a gate, 28, is hinged, the lower end of which gate normally rests upon the inclined surface of the plate 21, as best illustrated in Fig. 1.

In operation, when the clay is thrown through the opening 12, it is forced to drop upon the grating 20, immediately beneath the said opening, whereupon, the cylinder 14 being rapidly revolved, the teeth of the said cylinder plowing through the mass of clay thoroughly disintegrate the same, and at the same time the said teeth throw any stones through one of the openings 27 upon the inclined surface of the plate 21. The disintegrated clay, falling through the bars of the grating and from the teeth of the cylinder, is delivered to the endless apron 25 and carried by said apron to any suitable compartment for screening, and as the stones are successively thrown upon one side of the plate 21 the stones in contact with the gate 28 will be forced outward down the inclined surface of the plate by the stones entering the opening 27. Two gates are employed, one upon each side, in o der ha the cylinder 14 may be revolved in either direction.

The disks 15 of the cylinder may be secured upon the spindle 20 by lock-nuts or other equivalent fastening device, and the said spindle 20 and the drums 24 may be rotated in any approved manner.

Having thus described my invention, what I claim as new, and desire to secure by Letters Patent, is—

1. In a pulverizer, the combination, with a casing having an opening in its top and downwardly-projecting partitions 26 at each end of the casing-opening, of a toothed cylinder journaled in the casing, an adjustable grating above the cylinder and having its ends at the termination of the grating inclined downwardly, and gates hinged to the said partitions and having their lower free ends resting on the inclined ends of the grating, substantially as described.

2. In a pulverizer, the combination, with a casing, 10, provided with the grated opening 12 13 in its top and with the downwardly-projecting partitions 26, of the grating $20^a$ 21, the gates 28, pivoted to the partitions 26 and having their free ends resting on the said grating, the toothed cylinder 14, journaled in the casing below the grating, with its teeth projecting through said grating, and the apron 25 below the cylinder, substantially as herein shown and described.

3. A pulverizing-cylinder consisting of the series of disks 15, each provided with the annular groove 16 and the radial grooves 17, and the teeth 18, having T-shaped heads 19, substantially as herein shown and described.

JOHN W. SHAFFER.

Witnesses:
HIRAM FARRINGTON,
GEORGE B. BARNES.